United States Patent
Dincal et al.

(10) Patent No.: US 11,461,906 B2
(45) Date of Patent: Oct. 4, 2022

(54) SYSTEMS AND METHODS FOR MONITORING OFFSHORE STRUCTURES

(71) Applicant: Numeric Engineering, Inc., Houston, TX (US)

(72) Inventors: Selcuk Dincal, Houston, TX (US); Onur Guvener, Houston, TX (US); Ozgur Yilmaz, Houston, TX (US)

(73) Assignee: Numeric Engineering, Inc., Houston, TX (US)

( * ) Notice: Subject to any disclaimer, the term of this patent is extended or adjusted under 35 U.S.C. 154(b) by 208 days.

(21) Appl. No.: 16/729,290

(22) Filed: Dec. 27, 2019

(65) Prior Publication Data

US 2020/0211203 A1   Jul. 2, 2020

Related U.S. Application Data

(60) Provisional application No. 62/864,976, filed on Jun. 21, 2019, provisional application No. 62/787,132, filed on Dec. 31, 2018.

(51) Int. Cl.
*G06T 7/246* (2017.01)
*G06T 7/73* (2017.01)
*E02B 17/00* (2006.01)

(52) U.S. Cl.
CPC .......... *G06T 7/248* (2017.01); *E02B 17/0034* (2013.01); *G06T 7/74* (2017.01); *G06T 2207/10021* (2013.01)

(58) Field of Classification Search
CPC . G06T 7/74; G06T 2207/30204; G06T 7/246; G06T 7/248; G06T 2207/10021; G06T 2207/30164; E02B 17/0034
See application file for complete search history.

(56) References Cited

U.S. PATENT DOCUMENTS

| | | | |
|---|---|---|---|
| 9,750,420 B1* | 9/2017 | Agrawal | G06T 7/73 |
| 10,397,550 B2* | 8/2019 | Dumont | G06T 7/521 |
| 2009/0028404 A1* | 1/2009 | Bussadori | A61B 8/488 |
| | | | 382/130 |
| 2009/0226034 A1* | 9/2009 | Seki | G06T 7/246 |
| | | | 382/103 |
| 2010/0226541 A1* | 9/2010 | Kobayashi | G06T 7/77 |
| | | | 382/106 |
| 2017/0011503 A1* | 1/2017 | Newman | G01N 25/72 |
| 2017/0011553 A1* | 1/2017 | Chen | G06F 3/012 |

* cited by examiner

*Primary Examiner* — Pinalben Patel
(74) *Attorney, Agent, or Firm* — Conley Rose, P.C.

(57) ABSTRACT

A system including a camera configured to capture a first image of an offshore structure and a second image of the offshore structure, and a processor coupled to the camera, the processor configured to receive the first image and the second image from the camera, recognize a first visual pattern in the first image and the second image, extract pixel coordinates associated with a first position of the first visual pattern in the first image and a second position of the first visual pattern in the second image, and determine a first distance between the first position and the second position, or the first position of the first visual pattern and a first position of a second visual pattern fixably attached to the offshore structure in the first image.

27 Claims, 11 Drawing Sheets

SYSTEMS AND METHODS FOR MONITORING OFFSHORE STRUCTURES

CROSS-REFERENCE TO RELATED APPLICATIONS

This application claims benefit of U.S. provisional patent application Ser. No. 62/787,132 filed Dec. 31, 2018, and entitled "Offshore Structure Monitoring Systems and Methods," and U.S. provisional patent application Ser. No. 62/864,976 filed Jun. 21, 2019, and entitled "Offshore Structure Monitoring Systems and Methods," each of which is hereby incorporated herein by reference in its entirety.

STATEMENT REGARDING FEDERALLY SPONSORED RESEARCH OR DEVELOPMENT

Not applicable.

BACKGROUND

Offshore structures and assets, such as offshore platforms, vessels and associated equipment used in the production of hydrocarbons from subsea wells, may experience elevated and potentially severe dynamic loading from the surrounding environment and other sources. For example, components of offshore structures positioned subsea (e.g., production pipelines, jumpers, umbilicals, manifolds, etc.) may be subject to cyclical loading over their operational life due to the application of continually varying dynamic loads. Such cyclical loading may induce fatigue damage, potentially resulting in failure of the offshore structure or component.

In some offshore operations, indirect estimation of the physical displacement of a component of an offshore structure may be used to assess the structural integrity of the component. For example, physical displacement of a component of an offshore structure may be estimated indirectly from acceleration measurements collected from accelerometers and/or strain measurements from strain gauges attached to the component. Laser scanning may also be used in some applications to estimate dynamic displacements of a component of an offshore structure at a significantly higher cost, system complexity, power consumption, and excessive data generation relative to other indirect techniques such as accelerometers and strain gauges. Consequently, laser scanning is generally only suitable for short-term solutions. In yet some other cases, visual inspection of a component via a remotely operated vehicle (ROV) or personnel of the offshore structure may be relied on to estimate physical displacements.

BRIEF SUMMARY OF THE DISCLOSURE

An embodiment of a system for visually monitoring an offshore subsea structure comprises a camera configured to capture a first image of the offshore structure and a second image of the offshore structure, and a processor coupled to the camera, the processor configured to receive the first image and the second image from the camera, recognize a first visual pattern fixably attached to the offshore structure in the first image and the second image, extract pixel coordinates associated with a first position of the first visual pattern in the first image and a second position of the first visual pattern in the second image, and determine a first distance in physical units between the first position of the first visual pattern and the second position of the first visual pattern based on the pixel coordinates associated with the first position of the first visual pattern and the pixel coordinates associated with the second position of the first visual pattern, or the first position of the first visual pattern and a first position of a second visual pattern fixably attached to the offshore structure in the first image. In some embodiments, the processor is configured to determine the first distance in physical units between the first set of pixel coordinates of the first visual pattern in the first image and the first set of pixel coordinates associated with the second visual pattern in the first image, determine a second distance in physical units between the second set of pixel coordinates of the first visual pattern in the second image and a second set of pixel coordinates associated with the second visual pattern in the second image, and compare the first distance to the second distance to determine a movement of the first visual pattern relative to the second visual pattern in the first image and the second image. In some embodiments, the system further comprises a battery configured to power the camera. In certain embodiments, the system further comprises a communication cable coupling the camera to the processor, wherein the communication cable is configured to transmit the image from the camera to the processor. In certain embodiments, the system further comprises a transmitter coupled to the processor and configured to wirelessly transmit the first distance determined by the processor. In some embodiments, the processor is configured to determine a magnitude and a direction of a movement of the visual pattern in physical units from the first position of the visual pattern to the second position of the visual pattern based on the pixel coordinates associated with the first position of the visual pattern and the pixel coordinates associated with the second position of the visual pattern. In some embodiments, the processor is configured to issue an alarm in response to the magnitude of the movement of the visual pattern from the first position to the second position being greater than a predetermined threshold value. In certain embodiments, the processor is configured to determine the movement of visual pattern in six degrees-of-freedom. In certain embodiments, the processor is configured to estimate a strain of the offshore structure based on the first distance between the first position of the visual pattern and the second position of the visual pattern. In some embodiments, the system further comprises a gimbal coupled to the camera, wherein the processor is configured to move the gimbal to control a field of view of the camera. In some embodiments, the system further comprises a remotely operated underwater vehicle (ROV), wherein the camera is coupled to the ROV. In certain embodiments, the visual pattern comprises a quick response (QR) code.

An embodiment of a method for visually monitoring a subsea offshore structure comprises (a) capturing a first image of a first visual pattern fixably attached to the subsea offshore structure, (b) capturing a second image of the first visual pattern after (a), (c) determining a first set of pixel coordinates associated with the first visual pattern in the first image and a second set of pixel coordinates associated with the first visual pattern in the second image, and (d) determining a first distance in physical units between (i) the first set of pixel coordinates of the first visual pattern in the first image and the second set of pixel coordinates associated with the first visual pattern in the second image, or (ii) the first set of pixel coordinates of the first visual pattern in the first image and a first set of pixel coordinates associated with a second visual pattern fixably attached to the subsea offshore structure in the first image. In some embodiments, (d) comprises determining the first distance in physical units between the first set of pixel coordinates of the first visual pattern in the first image and the first set of pixel coordinates associated with the second visual pattern in the first image, determining a second distance in physical units between the second set of pixel coordinates of the first visual pattern in the first image and a second set of pixel coordinates associated with the second visual pattern in the second image, and comparing the first distance to the second distance to determine a movement of the first visual pattern relative to the second visual pattern between the first image and the second image. In some embodiments, (d) comprises converting a distance in pixels to the first distance in physical units based on a predetermined physical dimension of the first visual pattern. In certain embodiments, (a) comprises capturing the image using a camera, and the method further comprises (e) transmitting the image from the camera to a processor along a communication cable. In some embodiments, the camera is positioned on a subsea skid and the processor is positioned above a waterline. In certain embodiments, the method further comprises (e) capturing a temporally ordered plurality of images, (f) extracting pixel coordinates of the first visual pattern in each of the plurality of images, (g) determining a magnitude and a direction of a movement of the first visual pattern based on changes in the pixel coordinates between the plurality of images, and (h) converting the magnitude and the direction of the movement of the first visual pattern from changes in the pixel coordinates to physical units to estimate a physical displacement of the first visual pattern. In certain embodiments, the method further comprises (i) issuing an alarm in response to the magnitude of the movement of the first visual pattern being greater than a predetermined threshold value. In some embodiments, the method further comprises (e) moving a gimbal coupled to a camera that captures the first image and the second image to control a field of view of the camera. In some embodiments, the method further comprises (e) transporting a camera that captures the first image and the second image through a subsea environment using a remotely operated underwater vehicle (ROV). In certain embodiments, the method further comprises (f) guiding the trajectory of the ROV in response to the first image and the second image. In certain embodiments, the method further comprises (f) moving the ROV in the subsea environment to maintain the first visual pattern in a field of view of the camera as the offshore structure is installed in the subsea environment.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of exemplary embodiments of the disclosure, reference will now be made to the accompanying drawings in which.

DETAILED DESCRIPTION OF EXEMPLARY EMBODIMENTS

Figure 1:
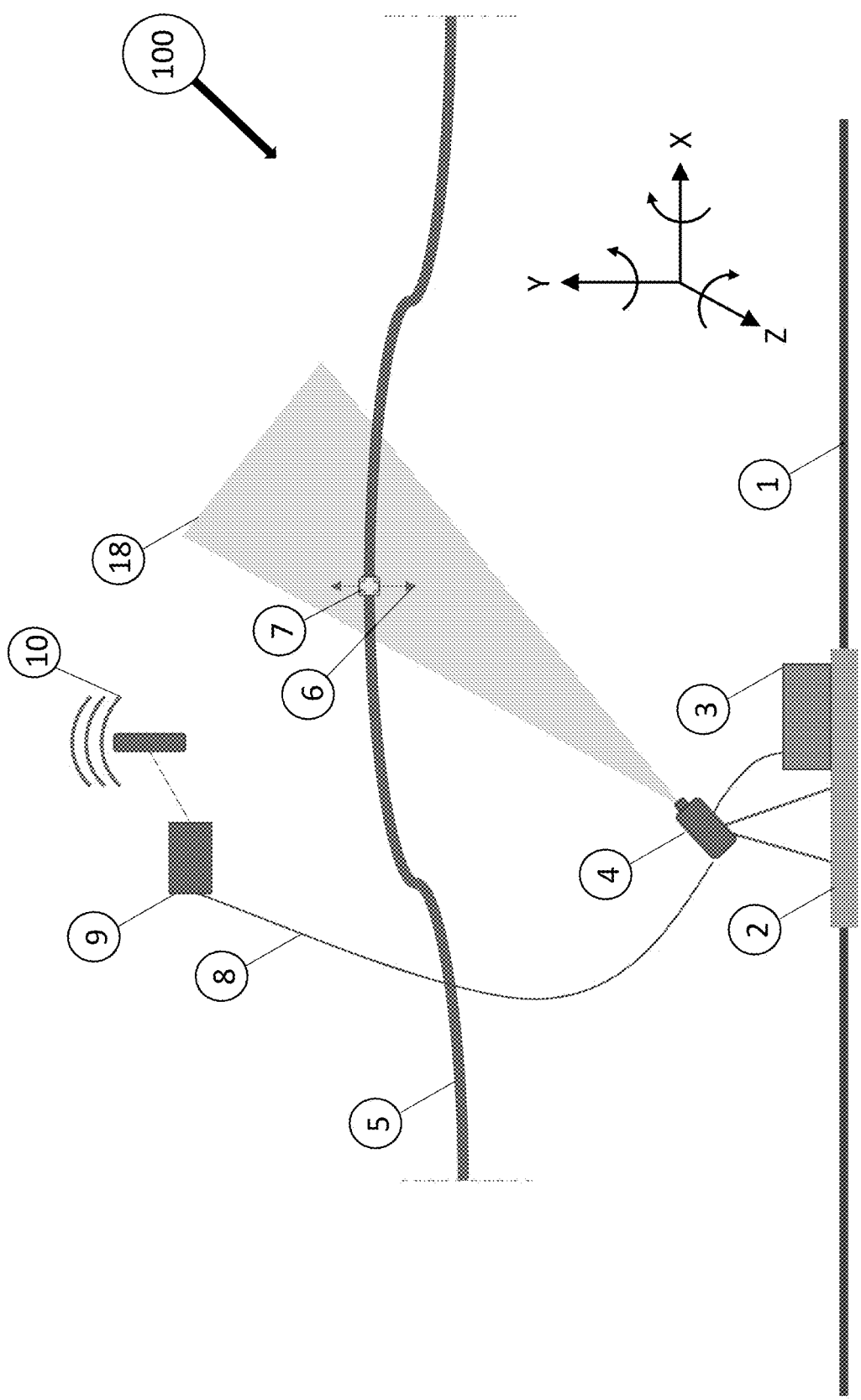
FIG. 1 is a schematic view of an embodiment of a system for visually monitoring an offshore structure in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

The disclosure relates generally to monitoring of offshore structures. Particularly, the disclosure relates to the detection of structural deflections, deformations and strains through computer vision software and monitoring system. In embodiments, computer vision software is used to determine the 3D position and motion of objects in a scene captured by a calibrated stereo or mono camera assembly. Pose estimation of a given monitored offshore structure is calculated in six degrees of freedom relative to the camera assembly. In some embodiments, the depth and coordinates of the objects, patterns, markers, or combinations thereof in the scene are estimated using the camera assembly. Additionally, in certain embodiments, the motion of the monitored offshore structure is tracked in each consecutive video or picture frame with the camera assembly. Results and/or data collected from monitoring the offshore structure is communicated in real time through communication systems such as the Internet and/or a local area network (LAN) to personnel such that the personnel may be alarmed or alerted in case a displacement and/or strain of the offshore structure exceeds a predetermined threshold amount.

The present disclosure includes accurate, robust and economical computer vision-based solutions to monitor and determine the integrity of offshore structures. A full hardware and software solution is proposed for offshore structural monitoring needs such as linear, rotational and periodic motion measurements, strain estimation, gap measurements, and structural pose estimation. An embodiment of a method for monitoring offshore structures include using stereo or mono cameras for estimating a 3D view of an offshore structure, merging estimates of stereo depth into a coherent holistic 3D model of the offshore structure when multiple depths are captured from different angles of the offshore structure via motion of the camera, and applying pose estimation to estimate the relative pose of the offshore structure with respect to the anchored camera. In some embodiments, the method includes installing markers with distinct shapes on the offshore structure being monitored to achieve more accurate and robust correspondence estimations, for stereo and pose estimation computations. Given that the actual size of the markers are known, better metric estimation is enabled via optimization techniques, such as bundle adjustment. In some embodiments, the method includes fine-tuning the 3D model and motion of the offshore structure via filtering and optimization techniques to reduce noise. In certain embodiments, the method includes applying anomaly detection methods to signal any unexpected structural or motion problems in the monitored offshore structure. In certain embodiments, the method includes applying motion detection and objection detection for reporting unexpected objects in the scene and for perimeter security. In some embodiments, the method includes deploying an autonomous search-and-estimate camera assembly in sites with multiple offshore structures to be monitored.

In embodiments, the monitoring system comprises a camera-light source-processor assembly installed on a gimbal that is controlled by a processor. Software running on the processor periodically moves the gimbal to capture images for all the structures in the scene, locks the camera when the image features or markers matches with the ones stored in the memory, zooms-in to make more accurate estimations, records the estimated 3D model and motion of the structure, then moves onto the next structure. The light source is also controlled by the processor in order to balance the image quality and/or energy consumption trade-offs. For fine-tuning, a filtering and/or optimization algorithm is applied to the raw estimations to improve 3D model and motion accuracy.

Embodiments of the offshore structure monitoring systems described herein allow precise and accurate structural monitoring of offshore structures, and can be used to capture precise and direct displacement measurements of the offshore structures. Additionally, the offshore structure monitoring systems provides 2D or 3D pose estimation of offshore structures to continuously monitor relative motions, offer accurate and economical means to measure strain in subsea offshore structures, and accurately estimates fatigue, stress, loads, or combinations thereof on offshore structures using the collected motion data. Further, embodiments of offshore structure monitoring systems described herein deliver tools to detect anomalies and warn personnel of any issues that may require an immediate action, and provide critical information regarding the state of the monitored offshore structure as part of an active integrity management program.

Embodiments of offshore structure monitoring systems described herein offer the potential for high accuracy and precision as compared to many conventional monitoring systems (e.g., monitoring systems that rely on accelerometer and/or strain gauge data, etc.) in detecting structural displacements of monitored offshore structures, and significant cost savings as compared to many conventional monitoring systems due to simplified design of the sensor or visual pattern attached to the monitored offshore structure (e.g., light emitting diodes (LEDs), lights, and/or paint organized in patterns, etc.). Additionally, embodiments of offshore structure monitoring systems described herein offer the potential for to enhance the service life of the monitoring equipment (e.g., basic sensors, field proven subsea camera assembly and accompanying battery pack), greater efficiency as compared to many conventional monitoring systems due to the ability to monitor several structures with a single (mono or stereo) camera assembly, and increased safety of the monitored offshore structures as compared to many conventional monitoring systems due to accurate and reliable data that are actively communicated to the stakeholders via a communication system of the offshore structure monitoring system.

Referring to FIG. 1, an embodiment of a system 100 for visually monitoring an offshore structure 5 is shown. In this embodiment, offshore structure monitoring system 100 generally includes a subsea skid 2 positioned on the sea floor 1, a battery 3, a camera assembly 4, a communication cable 8 extending to the surface or waterline (not shown in FIG. 1), a controller or computer 9, and a transmitter 10. Battery 3 and camera assembly 4 are secured to subsea skid 2, which physically supports the battery 3 and camera assembly 4 at the sea floor 1 and positions camera assembly 4 proximal an offshore structure 5 to be monitored by system 100. In other embodiments, camera assembly 4 and battery 3 may be supported by components other than subsea skid 2 positioned on the sea floor 1, or may be positioned directly on the sea floor 1. In this embodiment, camera assembly 4 is a stereo camera having a light source attached thereto. In other embodiments, camera assembly 4 may comprise a mono camera. As used herein, a "mono camera" refers to a camera having a single lens or a plurality of lenses positioned along a common lens axis and configured to produce a mono or monocular image. Additionally, as used herein, a "stereo camera" refers to a camera having a pair of lenses or a pair of plurality of lenses, where the pair of lenses of pair of plurality of lenses are positioned along a corresponding pair of lens axes which are parallel but spaced apart by a predetermined distance whereby the stereo camera is configured to produce a stereo image. Battery 3 provides power to camera assembly 4. Although battery 3 is shown as a distinct and separate component from camera assembly 4, in other embodiments, battery 3 may be incorporated into camera assembly 4.

Referring still to FIG. 1, in this embodiment, a visually discernable pattern 7 is mounted or rigidly attached to the offshore structure 5 to be monitored with system 100. Particularly, visual pattern 7 is fixably secured to offshore structure 5 such that relative movement between visual pattern 7 and offshore structure is prevented in each of the six degrees-of-freedom of the offshore structure 5, the six degrees-of-freedom comprising movement along and rotation about orthogonal X, Y, and Z axes as depicted in FIG. 1. As used herein, the term "visual pattern" is defined as a visual indicator separate and distinct from the component on which the visual indicator is positioned and configured such that the visual indicator is identifiable within a digital image by an algorithm executable by a processor whereby the algorithm may determine pixel coordinates of the visual indicator within the digital image.

Camera assembly 4 is positioned and oriented on subsea skid 2 such that visual pattern 7 remains within the field of view 18 of camera assembly 4 as offshore structure 5 and visual pattern 7 secured thereto are displaced or moved (such motion is schematically illustrated by arrow 6 in FIG. 1) by dynamic loads applied to offshore structure 5 from the surrounding subsea environment (e.g., wave action acting against offshore structure 5, etc.) and/or other sources such as, for example, internal fluid flow through offshore structure 5. The motion 6 of offshore structure 5 is captured by camera assembly 4 and transmitted by communication cable 8 to computer 9 for processing. Transmitter 10 is electrically coupled to computer 9 such that data and information can be communicated from computer 9 to a remote location. In this embodiment, transmitter 10 is a wireless transmitter that provides an Internet connection to the camera assembly 4 to allow data transmitted from camera assembly 4 to computer 9 to be communicated remotely to stakeholders responsible for the integrity of the offshore structure 5.

In embodiments described herein, camera assembly 4 has a frame resolution ranging from 720 pixels×576 pixels to 4320 pixels×3240 pixels; however, in other embodiments, the frame resolution of camera assembly 4 may vary. For example, in some embodiments, camera assembly 4 may have 64K (61440 pixels×34560 pixels) resolution. In certain embodiments, camera assembly 4 includes zooming capability. Depending on the frame resolution and zooming capability of camera assembly 4, each pixel of camera assembly 4 may represent a certain length or distance in the real world ranging from a couple of centimeters to submillimeter level. In general, camera assembly 4 can be a commercially available camera that has the foregoing specifications including, for example, a SubVIS Orca camera manufactured by Imenco AS of Postboks 2143 5504 Haugesund, Norway, the Tiger Shark camera manufactured by Imenco AS, or other commercially available camera. In some embodiments, visual pattern 7 comprises one more or lights (e.g., light emitting diodes (LEDs), etc.), while in other embodiments, visual pattern 7 comprises paint or some other visual pattern perceivable by camera assembly 4.

As shown in FIG. 1, in this embodiment, offshore structure 5 is a subsea pipeline or fluid conduit; however, in other embodiments, offshore structure 5 may comprise various offshore structures positioned below and/or above the waterline such as risers, manifolds, wellhead assemblies, etc. Motion 6 of the offshore structure 5 is captured by camera assembly 4 and communicated to computer 9 via communication cable 8. Computer 9 processes the captured motions prior to communicating to a remote location via transmitter 10. In this embodiment, data captured by camera assembly 4 is communicated via a hardwired connection provided by communication cable 8, which is sufficient for shallow water applications; however, in other embodiments, including deep water applications where a hard wired connection may be impractical, information captured by camera assembly 4 is communicated to the surface via various components configured for subsea data transmission. For example, in some embodiments, information captured by camera assembly 4 may be communicated to the surface using sound waves propagated through the water via a subsea acoustic transmitter in signal communication with camera assembly 4. For example, hydrophones may be coupled to camera assembly 4 for propagating acoustic signals to the surface. In other embodiments, a commercially available subsea radio may be coupled to camera assembly 4 for wireless deep water communication to the surface. Particularly, low frequency radio signals are capable of propagating through seawater and are generally immune to acoustic noise interference.

Figure 2:
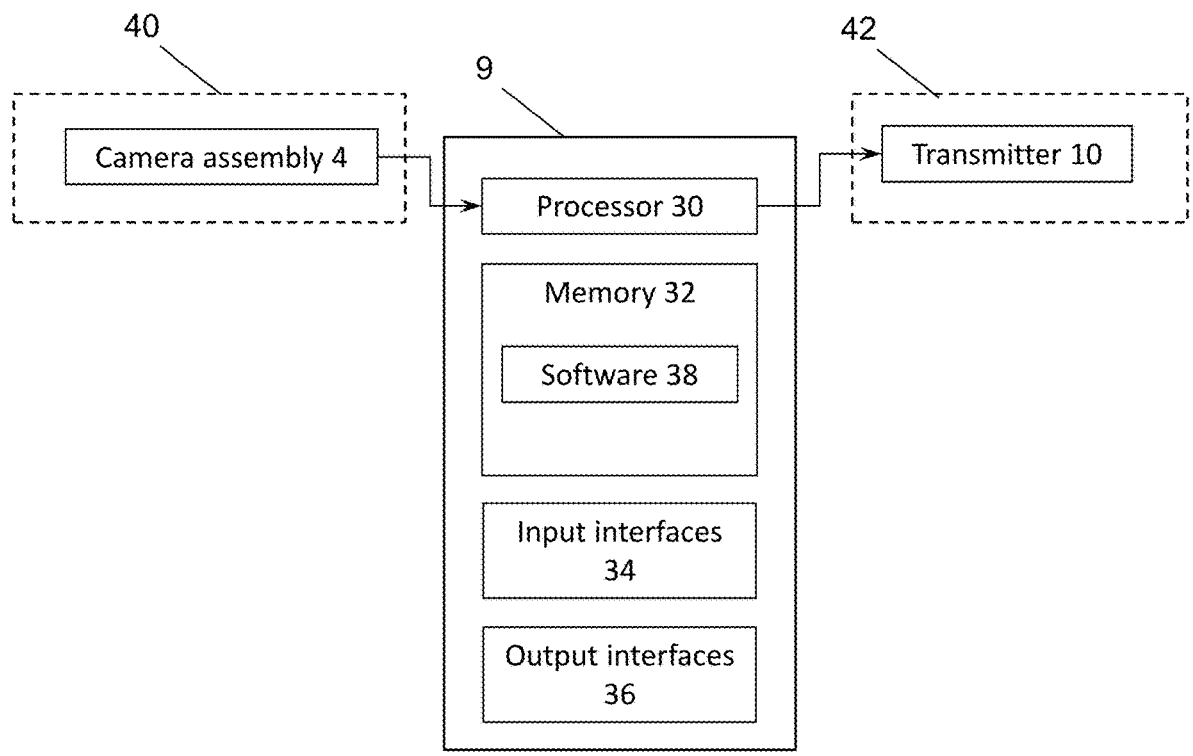
FIG. 2 is a schematic view of an embodiment of a computer of the system of FIG. 1 in accordance with principles disclosed herein.

Referring to FIGS. 1, 2, computer 9 may include a processor 30 (e.g., microprocessor, central processing unit, or collection of such processor devices, etc.), memory 32, one or more input interface(s) 34 (e.g., keyboard, mouse, etc.), and one or more output interface(s) 36 (e.g., monitor, audible alarm, visual alarm, etc.) shown in FIG. 2. Processor 30, memory 32, and interface(s) 34, 36 are coupled to a system bus that allows the transmission of electronic signals therebetween. Input Interfaces 34 allow an operator of computer 9 to enter data into computer 9 and output interfaces 36 supply information to the operator of computer 9. Processor 30 executes software 38 (e.g., machine-readable instructions) provided on memory 32. Memory 32 can store data communicated by one or more input devices 40 and the results of processing executed by processor 30, as well as store the software 38 to be executed by processor 30. Memory 32 may comprise volatile storage (e.g., random access memory), non-volatile storage (e.g., flash storage, read only memory, etc.), or combinations of both volatile and non-volatile storage. Data consumed or produced by the machine-readable instructions can also be stored on memory 32. The software 38 may comprise non-transitory computer readable medium. Although in the embodiment of FIG. 2 computer 9 includes input interfaces 34 and output interfaces 36, in some embodiments, computer 9 may not include input interfaces 34 and/or output interfaces 36.

Computing device 310 receives input data from input devices 40 (e.g., camera assembly 4) and transmits output data to output devices 42 (e.g., transmitter 10) after receiving the input data from input devices 40. For example, computer 9 receives images or video frames of visual pattern 7 captured and transmitted by camera assembly 4. The software 38 of computer 9 includes an algorithm or method stored in memory 32 thereof for processing the received images of visual pattern 7 via processor 30 to produce output data indicative of motion 6 of visual pattern 7, which is transmitted to remote users of offshore monitoring system 100 via transmitter 10.

Figure 3:
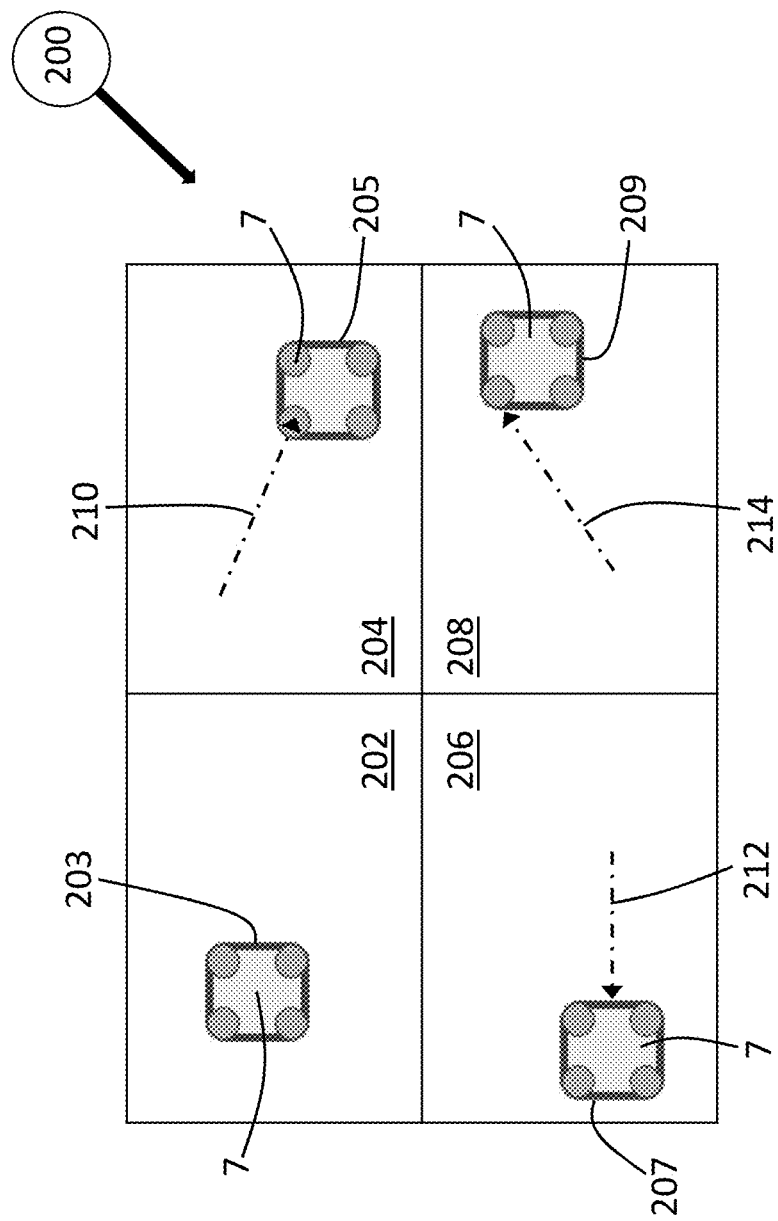
FIG. 3 is a schematic representation of an embodiment of an algorithm for visually monitoring the offshore structure of FIG. 1 in accordance with principles disclosed herein.

The algorithm of software 38 stored on memory 32 of computer 9 quantifies the motion 6 of visual pattern 7 depicted in the images received by computer 9 such that the degree of motion 6 of visual pattern 7 can be analyzed by responsible personnel. For example, referring now to FIG. 3, a schematic representation 200 of a plurality of temporally sequential images or video frames 202, 204, 206, 208 of an offshore structure (e.g., offshore structure 5 shown in FIG. 1) captured by a camera assembly (e.g., camera assembly 4 shown in FIG. 1). In particular, FIG. 3 illustrates images or video frames 202-208 of a visual pattern 7 as previously described fixably attached to the offshore structure such that the position and movement of visual pattern 7 is representative of the position and movement of the offshore structure to which it is attached. Thus, the video frames 202, 204, 206, 208 visually indicate the motion (e.g., motion 6 indicated schematically in FIG. 1) of visual pattern 7.

Particularly, in the first or "n'th" video frame 202 shown in FIG. 3, visual pattern 7 is positioned at a first or "n'th" position 203 corresponding to a first two-dimensional coordinate ($X_n$, $Y_n$). In the second or "n+1'th" video frame 204 shown in FIG. 3, visual pattern 7 is displaced from the first position 203 in accordance with a first motion 210 extending in both the X and Y dimensions to a second or "n+1'th" position 205 corresponding to a second two-dimensional coordinate ($X_{n+1}$, $Y_{n+1}$). In the third or "n+2'th" video frame 206 shown in FIG. 3, visual pattern 7 is displaced from the second position 205 in accordance with a second motion 212 to now occupy a third or "n+2'th" position 207 corresponding to a third two-dimensional coordinate ($X_{n+2}$, $Y_{n+2}$). In the fourth or "n+3'th" video frame 208 shown in FIG. 3, visual pattern 7 is displaced from the third position 207 in accordance with a third motion 214 to now occupy a fourth or "n+3'th" position 209 corresponding to a fourth two-dimensional coordinate ($X_{n+3}$, $Y_{n+3}$).

In the example described above, coordinates ($X_n$, $Y_n$), ($X_{n+1}$, $Y_{n+1}$), ($X_{n+2}$, $Y_{n+2}$), ($X_{n+3}$, $Y_{n+3}$) associated with positions 203, 205, 207, 209, respectively, correspond to particular pixels in each video frame 202, 204, 206, 208, respectively, and thus, the magnitude of each movement 210, 212, 214 in the X and Y dimension can be represented in pixels. For example, the first movement 210 between the first position 203 and the second position 205 may be a movement of visual pattern 7 in the X dimension of 1,200 pixels and in the Y dimension by 300 pixels Given that the physical dimensions of visual pattern 7 as well as the resolution of the camera assembly capturing video frames 202, 204, 206, 208 are known, the magnitude of each movement 210, 212, 214 in the X and Y dimensions can be converted from pixels to physical units of distance (e.g., millimeters, etc.). Thus, a visual depiction of the motion (e.g., movements 210, 212, 214) of visual pattern 7 provided by the camera assembly can be quantified as physical displacements over time through multi-dimensional space.

Figure 4:
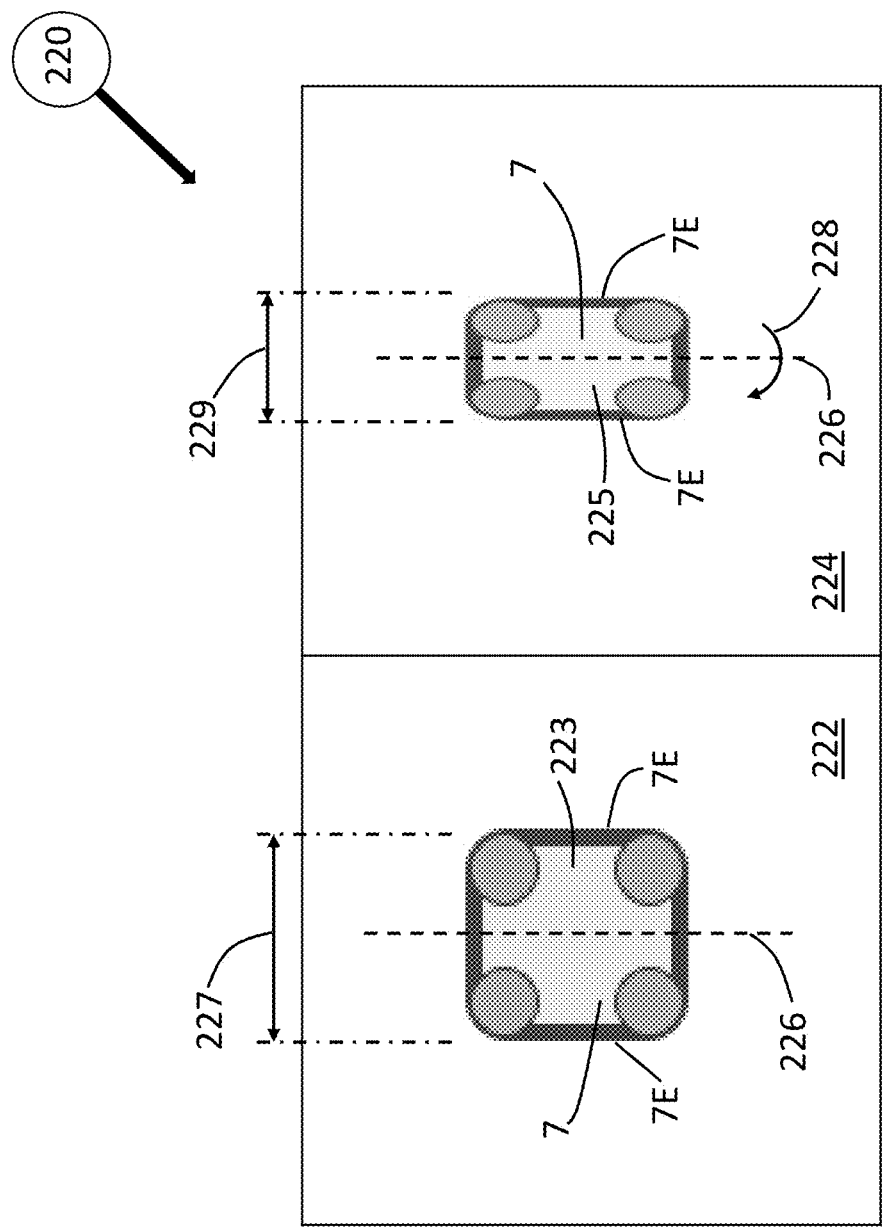
FIG. 4 is another schematic representation of an embodiment of an algorithm for visually monitoring the offshore structure of FIG. 1 in accordance with principles disclosed herein.

Rotation of visual pattern 7 about one or more of the orthogonal X, Y dimensions or axes may also be monitored and analyzed by responsible personnel. For example, referring to FIG. 4, another schematic representation 220 of a plurality of temporally sequential images or video frames 222, 224 of an offshore structure (e.g., offshore structure 5 shown in FIG. 1) captured by a camera assembly (e.g., camera assembly 4 shown in FIG. 1). Particularly, in the first or "n'th" video frame 222 shown in FIG. 4, visual pattern 7 is positioned at a first or "n'th" rotational position 223 relative a rotational axis 226 which extends parallel with the Y axis or dimension. In the second or "n+1'th" video frame 224 shown in FIG. 4, visual pattern 7 is rotated about rotational axis 226 from the first rotational position 223 in accordance with a rotational motion or rotation (indicated schematically in FIG. 4 by arrow 228) about rotational axis 226 to occupy a second rotational position 225 in video frame 224.

In the first rotational position 223, visual pattern 7 may have a first dimension or width 227 captured in video frame 222. First width 227 may be defined by a first pair of pixel coordinates (e.g., $X1_n$, $Y_n$ and $X2_n$, $Y_n$ in this example) corresponding to a pair of outer edges 7E of the visual pattern 7, where the first width 227 extends between the pair of outer edges 7E of visual pattern 7. Due to rotation 228 of visual pattern 7 about rotational axis 226, the first width 227 of visual pattern 7 may be altered in video frame 224 to provide a second dimension or width 229 of visual pattern 7 which is less than the first width 227 captured in video frame 222. Second width 229 may be defined by a second pair of pixel coordinates (e.g., $X1_{n+1}$, $Y_{n+1}$ and $X2_{n+1}$, $Y_{n+1}$ in this example) corresponding to a pair of outer edges 7E of the visual pattern 7, where the second width 229 extends between the pair of outer edges 7E of visual pattern 7. The magnitude of the change in width 227, 229 of visual pattern 7 may correspond to a magnitude of pixels. For instance, the first width 227 of visual pattern 7 in the first rotational position 223 may comprise 100 pixels (extending between $X1_n$ and $X2_n$ in this example) while the second width 229 of visual pattern 7 in the second rotational position 225 may comprise 70 pixels (extending between $X1_{n+1}$ and $X2_{n+1}$ in this example). Given that the physical dimensions of visual pattern 7 as well as the resolution of the camera assembly capturing video frames 222, 224 are known, the magnitude of the change in the dimension or width (the difference between widths 227, 229) of visual pattern 7 due to the rotation 228 of visual pattern 7 between rotational positions 223, 225 can be converted from pixels to degrees of rotation about rotational axis 226. Thus, a visual depiction of the rotation (e.g., rotation 228) of visual pattern 7 provided by the camera assembly can be quantified as a physical rotation of visual pattern 7 over time through multi-dimensional space. In other embodiments, rather than tracking a change in dimension of a single visual pattern 7, rotation of an offshore structure may be monitored by monitoring the distance between a plurality of visual patterns 7 attached to the offshore structure as the offshore structure rotates relative to a camera assembly (e.g., camera assembly 4 of FIG. 1).

In the examples described above, the motions and rotations of visual pattern 7 are referenced to a two-dimensional or 2D space defined by X and Y dimensions for illustrative purposes only. It should be appreciated that the same principles can be applied in three-dimensional or 3D space to capture the 3D movement and/or rotation of visual pattern 7 in six degrees-of-freedom with the camera assembly and quantify such movements with a computer (e.g., computer 9 shown in FIG. 1) to determine 3D physical displacements and/or rotations of visual pattern 7 along/about three orthogonal X, Y, and Z dimensions or axes (i.e., displacement and/or rotation along/about the X dimension, displacement and/or rotation along/about the Y dimension, and/or displacement and/or rotation along/about the Y dimension). Additionally, given that the visual pattern 7 is affixed to the offshore structure such that relative translational and rotational movement between visual pattern 7 and the offshore structure is prevented, the determined 3D physical displacements of visual pattern 7 calculated by the computer is representative of the 3D physical displacements of at least the portion of the offshore structure to which visual pattern 7 is attached.

In this embodiment, the computer also determines an estimated strain of at least the portion of the offshore structure to which visual pattern 7 is attached based on the estimated 3D physical displacements of visual pattern 7. For example, any given deformation and/or displacement corresponds to a unique solution of strain and/or stress results in a structure with known geometric and material properties using the fundamental laws of mechanics.

In some embodiments, the estimated physical displacements provided or calculated by the computer is used to construct a 3D model of the monitored offshore structure using techniques known in the art. The 3D model can be fine-tuned by filtering and optimization techniques to reduce noise within the estimated physical displacements. Anomaly detection methods may be employed when analyzing the estimated 3D physical displacements to identify and indicate the presence of any unexpected structural problems in, or motions of, the monitored offshore structure. Still further, motion detection and object detection may be monitored by the computer to identify and then report unexpected objects in the scene and for perimeter security. In order to assist the stakeholders responsible for the monitoring the offshore structure in making educated decisions regarding the integrity of the offshore structure, alarms may be generated (e.g., via computer 9 shown in FIG. 1) to warn the stakeholders should the estimated 3D physical displacements (or derivative properties such as, for example, strain) exceed predetermined threshold values.

Figure 5:
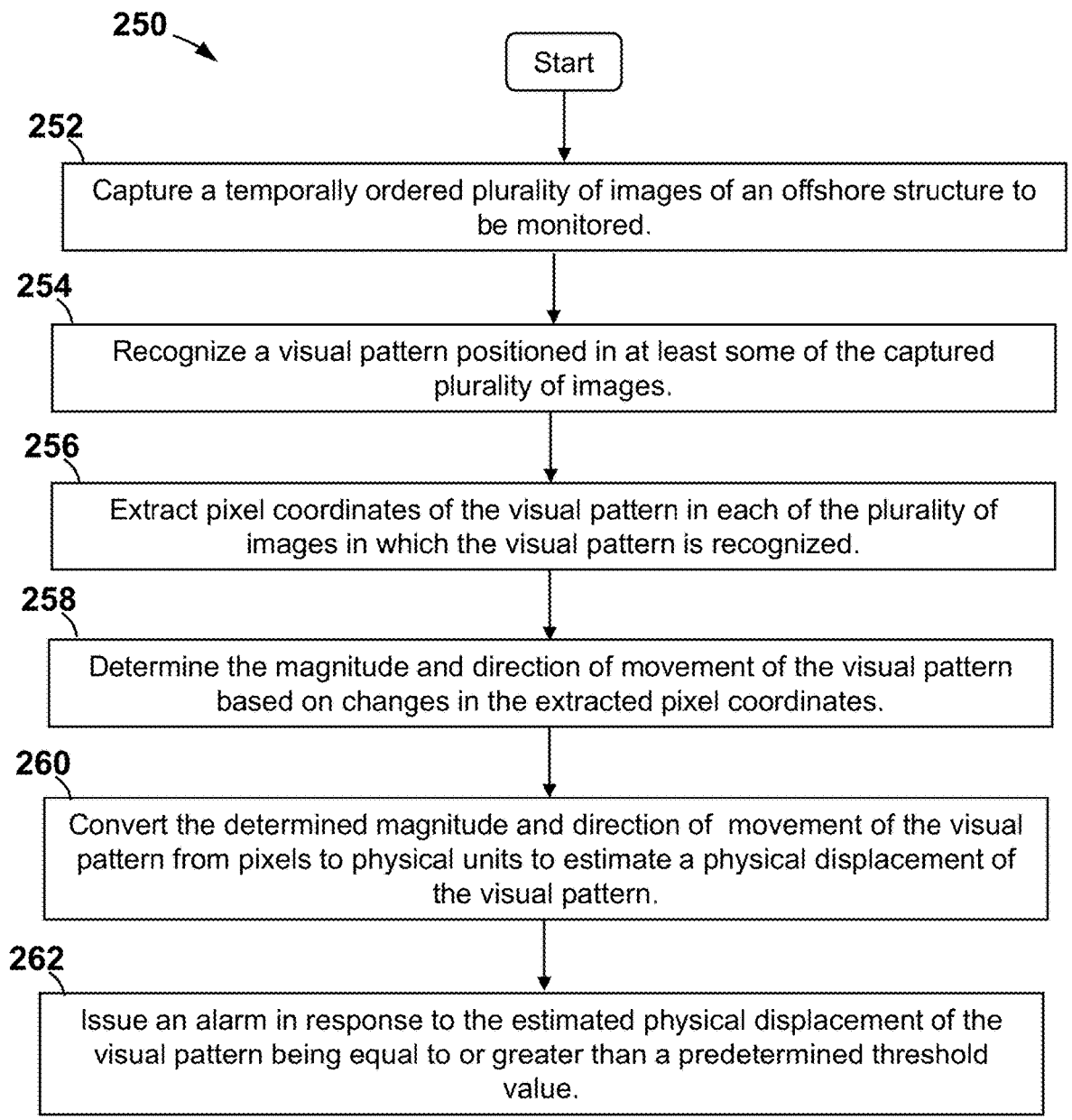
FIG. 5 is a flowchart illustrating an embodiment of a method for visually monitoring an offshore structure.

Referring now to FIG. 5, a method 250 for visually monitoring an offshore structure is shown. It should be understood that features of method 250 may be performed (e.g., wholly or partially) by a computer of an offshore structure monitoring system (e.g., computer 9 of offshore structure monitoring system 100 shown in FIG. 1). As a result, the computer 9 of offshore structure monitoring system 100 may include and execute machine-readable instructions (e.g., non-volatile machine readable instructions) for performing the method 250 described in more detail below. Method 250 may generally be described as a computer vision algorithm that utilizes a machine (e.g., computer shown in FIG. 1) to understand and analyze visual images, and particularly, utilizes the machine to identify and track the motion of select objects positioned within the field of view of a camera.

As will be discussed further herein, method 250 generally includes acquiring image and/or video data, recognizing pattern(s) in the captured image and/or video data via the captured image and/or video data, extracting pixel coordinates of one or more features of each captured image and/or video frame, calculating pixel coordinate differences of features in different image and/or video frame and converting the pixel coordinate data into physical units (e.g., millimeters, centimeters, etc.), and, if the extracted data exceeds a pre-determined threshold value, alerting an end-user about the incident. In this manner, method 250 may be used to estimate the relative pose of offshore structure 5 with respect to camera assembly 4.

Initially, method 250 includes capturing a temporally ordered plurality of images of an offshore structure to be monitored at block 252. In some embodiments, camera assembly 4 previously described is used to perform block 252. Namely, block 252 comprises capturing a temporally ordered plurality of images (e.g., a plurality of video frames of a captured video) of the offshore structure 5 using camera assembly 4. Method 250 proceeds at block 254 by recognizing a visual pattern positioned in at least some of the captured plurality of images. For example, in some embodiments, block 254 includes transmitting the plurality of images from camera assembly 4 to the computer 9 shown in FIG. 1 and, via computer 9, recognizing or identifying visual pattern 7 (shown in FIG. 1) in at least some of the plurality of images transmitted to computer 9.

At block 256, method 250 proceeds by extracting pixel coordinates of the visual pattern in each of the plurality of images in which the visual pattern is recognized. For example, in certain embodiments, block 256 includes using computer 9 to extract the pixel coordinates $(X_n, Y_n)$, $(X_{n+1}, Y_{n+1})$, $(X_{n+2}, Y_{n+2})$, $(X_{n+3}, Y_{n+3})$ that correspond to the positions 203, 205, 207, 209, respectively, of visual pattern 7 (shown in FIG. 3). Method 250 continues at block 258 by determining the magnitude and direction of movement of the visual pattern based on changes in the extracted pixel coordinates. For example, in some embodiments, block 258 includes using computer 9 to determine the magnitude and direction of movements 210, 212, 214 of visual pattern 7 (shown in FIG. 3) based on the differences between pixel coordinates $(X_n, Y_n)$, $(X_{n+1}, Y_{n+1})$, $(X_{n+2}, Y_{n+2})$, $(X_{n+3}, Y_{n+3})$. The magnitude and direction of first movement 210 can be determined using computer 9 based on the difference between pixel coordinates $(X_n, Y_n)$, $(X_{n+1}, Y_{n+1})$; the magnitude and direction of second movement 212 can be determined based on the difference between pixel coordinates $(X_{n+1}, Y_{n+1})$, $(X_{n+2}, Y_{n+2})$, and so on and so forth. As another example, block 258 includes using computer 9 to determine a magnitude of the rotation 228 of visual pattern 7 based on the change in dimension or width of visual pattern 7 corresponding to the difference between a first dimension or width 227 defined by the distance extending between pixel coordinates $(X1_n$ and $X2_n)$ and a second dimension or width 229 defined by the distance extending between pixel coordinates $(X1_{n+1}$ and $X2_{n+1})$.

Method 250 continues at block 260 by converting the determined magnitude and direction of movement of the visual pattern from pixels to physical units to estimate a physical displacement of the visual pattern. For example, in some embodiments, block 260 includes using computer 9 to convert the magnitude and direction of movements 210, 212, 214 of visual pattern 7 (shown in FIG. 3) from pixels to physical units (e.g., millimeters) to estimate the physical displacements of visual pattern 7 in 2D or 3D across six degrees-of-freedom. As described above, the conversion between pixels and physical units may be based on the predetermined resolution of camera assembly 4 and the predetermined physical dimensions of visual pattern 7. Thus, in certain embodiments, the physical dimensions of visual pattern 7 and resolution of camera assembly 4 are stored in the memory of computer 9.

Referring still to FIG. 5, method 250 proceeds at block 262 by issuing an alarm in response to the estimated physical displacement of the visual pattern being equal to or greater than a predetermined threshold value. For example, in some embodiments, block 262 includes computer 9 communicating or transmitting an alarm signal to remotely positioned personnel of the offshore structure monitoring system 100 via the transmitter 10 (shown in FIG. 1). The alarm may be issued in response to at least one of the magnitude and direction of movement of visual pattern 7 determined at blocks 258, 260 being greater than the predetermined threshold value. Alternatively or in addition, the alarm may be issued in response to a stress, strain or other property derived from the determined magnitude and direction of movement of visual pattern 7 being greater than a predetermined threshold stress, strain or other property.

Figure 6:
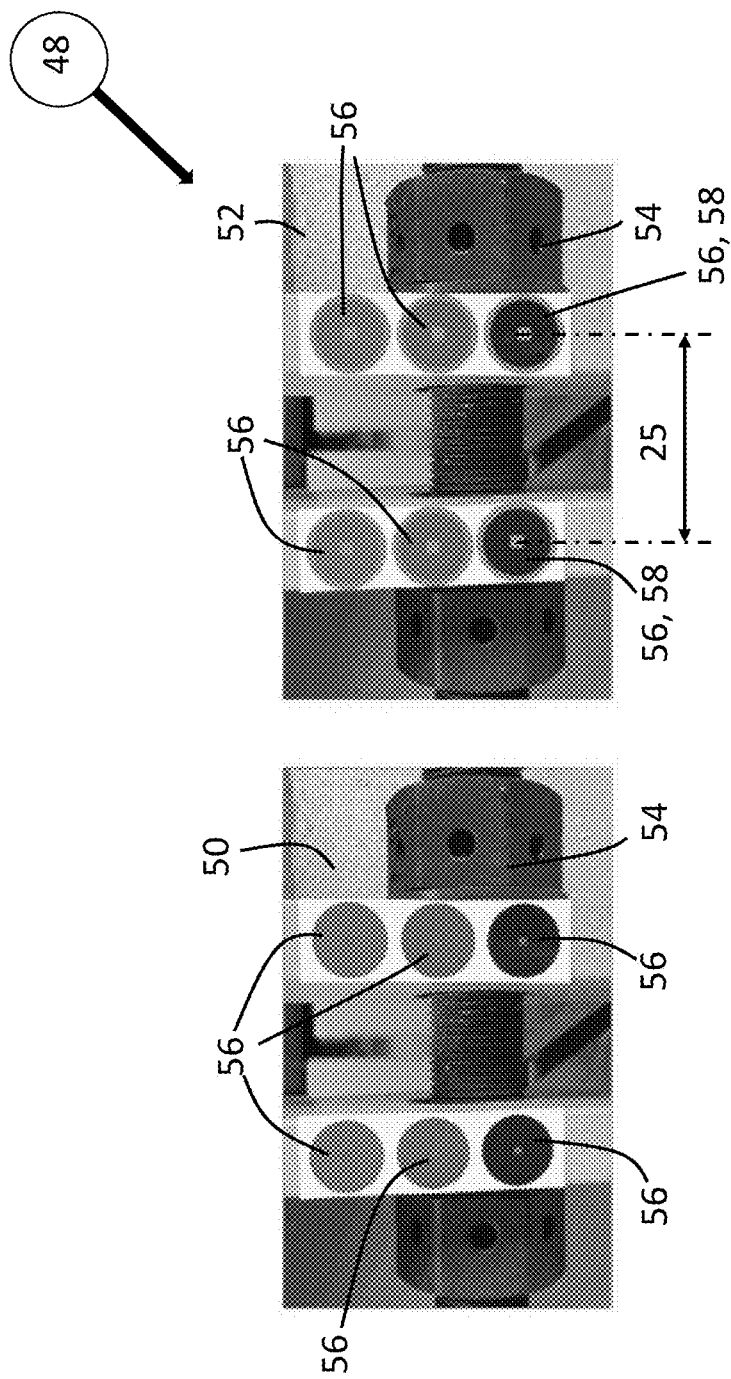
FIG. 6 illustrates images of an exemplary implementation of the method of FIG. 5.

Referring briefly to FIG. 6, an exemplary implementation 48 of at least some of the blocks 252-262 of method 250 is shown. More specifically, FIG. 6 illustrates a pair of images 50, 52 of an exemplary offshore structure 54 having a plurality of visual patterns 56 fixably attached thereto. In this example, each image 50, 52 comprises the same image captured by the camera assembly and transmitted to the computer of an offshore structure monitoring system (e.g., offshore structure monitoring system 100) and are only shown separately for purposes of clarity and further explanation. Particularly, first image 52 illustrates a raw image of offshore structure 54 captured by the camera assembly (e.g., camera assembly 4 shown in FIG. 1) and transmitted to the computer (e.g., computer 9 shown in FIG. 1).

As indicated in the second image 52, the computer is configured to implement at least some of the blocks 252-262 of method 250 by recognizing or identifying the visual patterns 56 located within second image 52, extracting pixel coordinates for the visual patterns 56 located within second image 52, determining a distance 25 in pixels between the respective centers of a selected pair 58 of the visual patterns 56, and converting the distance 25 in pixels between the pair 58 of visual patterns 56 into physical units to estimate the physical distance between the pair 58 of visual patterns 56 based on the known diameter of each visual pattern 56 stored in the memory of the computer. Additionally, in some embodiments, the computer is configured to monitor the distance 25 between the pair 58 of visual patterns 56 over time and the computer may issue an alarm to a user of the offshore structure monitoring system (e.g., via transmitter 10 shown in FIG. 1) if the distance 25 between the pair 58 of visual pattern increases to an amount equal to or greater than a predetermined threshold distance. Further, in some embodiments, a ratio of change in the distance 25 to an initially estimated distance 25 between the pair 58 of visual patterns 56 is determined by the computer to estimate or calculate a strain of the offshore structure 54.

Figure 7:
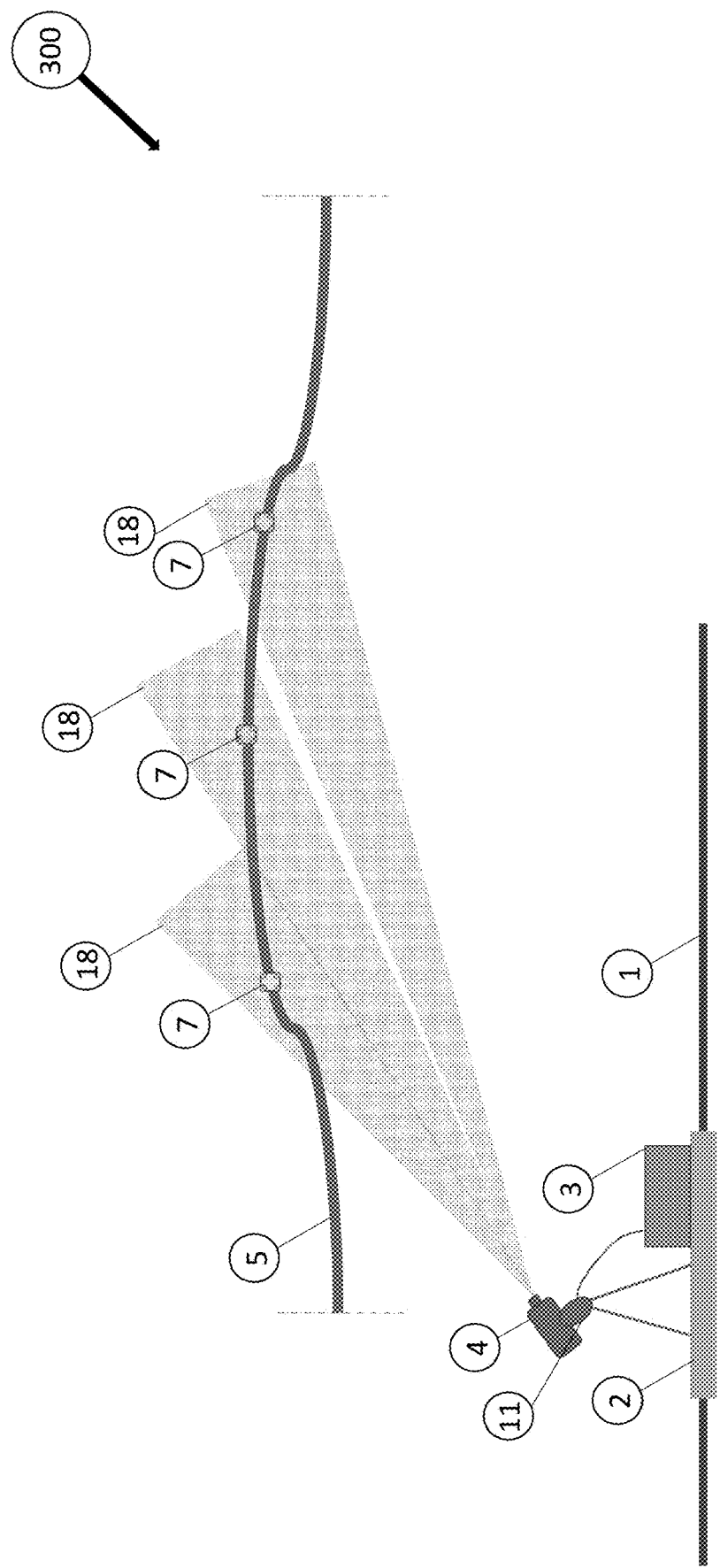
FIGS. 7-11 are schematic views of embodiments of systems for visually monitoring offshore structures in accordance with principles disclosed herein.

Referring now to FIG. 7, another embodiment of a system 300 for visually monitoring an offshore structure is shown. Offshore structure monitoring system 300 includes features in common with the offshore structure monitoring system 100 shown in FIG. 1, and shared features are labeled similarly. In this embodiment of offshore structure monitoring system 300, camera assembly 4 is an autonomous search-and-estimate camera assembly coupled to a gimbal 11 to track multiple visual patterns or markers 7 intermittently. Particularly, camera assembly 4 rotates on gimbal 11 to search and find visual patterns or markers 7. Once at least one of the visual patterns 7 moves into the field of view 18 of camera assembly 4, camera assembly 4 zooms in on the visual pattern 7 and records its motions in the manner previously described.

For example, in some embodiments, a computer (not shown in FIG. 7) of offshore structure monitoring system 300 configured similarly as computer 9 shown in FIG. 1 executes at least some of the steps defined by blocks 252-262 of method 250 shown in FIG. 5 in response to at least one of the visual patterns 7 falling into the field of view 18 of camera assembly 4. This allows the offshore structure monitoring system 300 to monitor the offshore structure 5 at multiple points or to monitor multiple offshore structures using a single offshore structure monitoring system 300. In some embodiments, the operation of gimbal 11 is controlled by the computer 9 whereby camera 4 rotates to search for and find at least one of the visual patterns 7.

Figure 8:
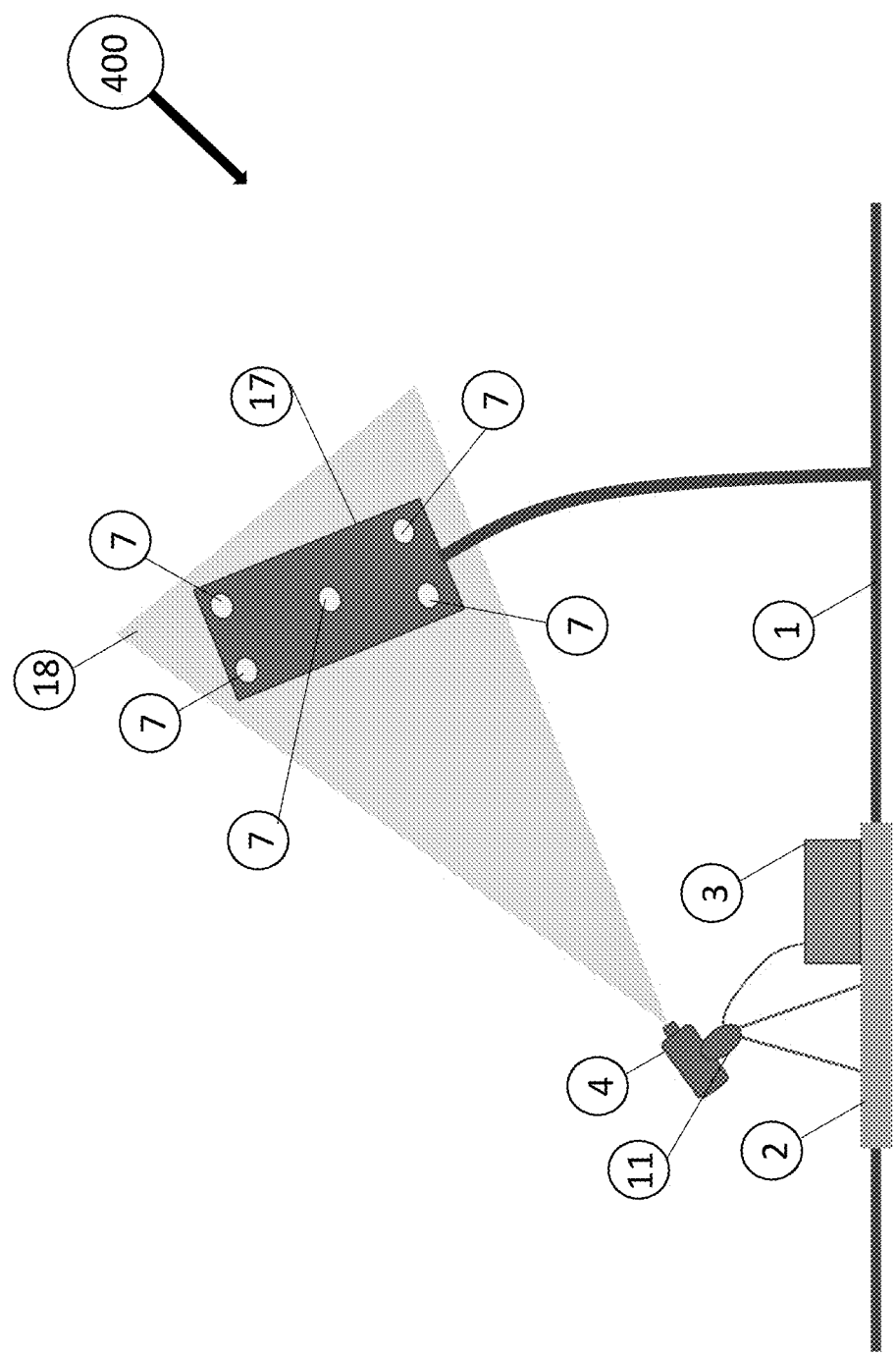

Referring now to FIG. 8, another embodiment of a system 400 for visually monitoring an offshore structure is shown. Offshore structure monitoring system 400 includes features in common with the offshore structure monitoring system 100 shown in FIG. 1, and shared features are labeled similarly. In this embodiment, the camera assembly 4 is a stereo camera configured to simultaneously track a plurality of visual patterns 7, each patterns being fixably attached to an offshore structure 17. Particularly, in this embodiment, multiple visual patterns 7 fall into the field of view 18 of the stereo camera assembly 4, which allows offshore structure monitoring system 400 to track rigid body motions and estimate a pose of offshore structure 17 relative the stereo camera in six degrees-of-freedom. For example, in the embodiment shown in FIG. 8, five visual patterns 7 are fixably attached to offshore structure 17. The physical dimensions of each visual pattern 7 and the physical distances between each visual pattern 7 are stored in a computer (not shown in FIG. 8) of offshore structure monitoring system 400, which is configured similarly as computer 9 shown in FIG. 1. The computer is configured to recognize the five separate visual patterns 7 in the images of offshore structure 17 transmitted thereto by camera assembly 4 and determine five pixel coordinates $(X_{1n}, Y_{1n}, Z_{1n})$, $(X_{2n}, Y_{2n}, Z_{2n})$, $(X_{3n}, Y_{3n}, Z_{3n})$, $(X_{4n}, Y_{4n}, Z_{4n})$, $(X_{5n}, Y_{5n}, Z_{5n})$ corresponding to the five visual patterns 7. The computer 9 also estimates a 3D pose of offshore structure 17 relative to camera assembly 4 based on the five determined pixel coordinates and the known physical dimensions of each visual pattern 7 and the physical distances between each visual pattern 7.

Figure 9:
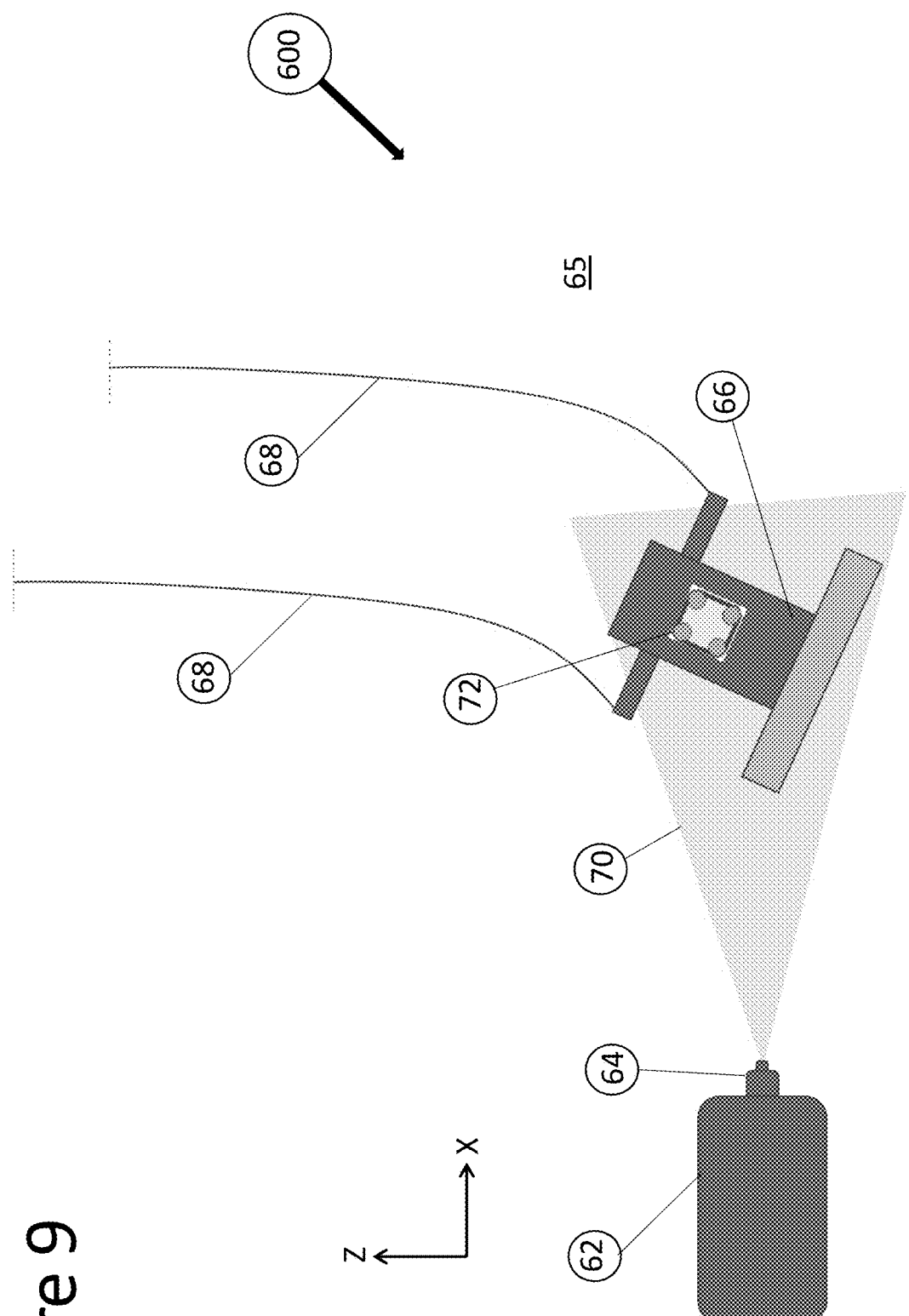

Referring now to FIG. 9, another embodiment of a system 600 for visually monitoring an offshore structure is shown. In particular, offshore structure monitoring system 600 is generally configured to permit the remote monitoring of the installation of offshore structure 66 in a subsea environment 65. For example, system 600 remotely monitors the installation of offshore structure 66 from a surface vessel positioned above offshore structure 66 and/or from other remote locations such as land-based locations. In this embodiment, offshore monitoring system 600 generally includes a remotely operated underwater vehicle (ROV) 62, a camera (mono or stereo) assembly 64, an offshore structure 66, and installation cables 68.

Offshore structure 66 is remotely monitored as it is lowered towards a sea floor (not shown in FIG. 9) using installation cables 68 suspended from a surface vessel. Particularly, camera 64 is coupled or mounted to ROV 62, which follows the offshore structure 66 as it travels through the subsea environment to ensure offshore structure 66 remains within a field of view 70 of camera 64. In some embodiments, camera 64 is a mono camera; however, in other embodiments, camera 64 is a stereo camera. In general, ROV 62 can be remotely controlled at the surface or other remote location, or ROV 62 may be an autonomous underwater vehicle configured to operate autonomously.

In this embodiment, one or more visual patterns or indicators 72 are positioned on an exterior of the offshore structure 66, and camera 64 is configured to track the visual pattern 72. In some embodiments, visual pattern 72 is configured similarly as the visual pattern 7 shown in FIG. 1; however, in other embodiments, the configuration of visual pattern 72 may vary. As offshore structure 66 travels through the subsea environment, ROV 62 positions itself proximal offshore structure 66 and travels in concert with offshore structure 66 such that visual pattern 72 remains in the field of view 70 of the camera 64 mounted to ROV 62. Thus, unlike the stationary camera 4 shown in FIG. 1, camera 64 may travel in concert with the moving offshore structure 66 to maintain visual pattern 72 within the field of view 70 of camera 64 as offshore structure 66 travels subsea towards the sea floor.

With visual pattern 72 remaining in the field of view 70 of camera 64, offshore structure monitoring system 600 tracks the rigid body motions and the estimation, in six degrees-of-freedom, of the pose or attitude of offshore structure 66 relative to the surrounding environment as the offshore structure 66 is being installed in the subsea environment. For example, in a global coordinate system having X, Y, and Z axes (shown partially in FIG. 9), the orientation of offshore structure 66 relative the global X, Y, and Z axes may be monitored remotely. In some embodiments, offshore structure monitoring system 600 comprises a computer (not shown in FIG. 9) configured similarly as computer 9 shown in FIG. 1 and in signal communication with camera 64, where the computer is configured to implement at least some of the blocks 252-262 of the method 250 shown in FIG. 5 to track rigid body motions of offshore structure 66 and estimate, in six degrees-of-freedom, the pose or attitude of offshore structure 66 relative to the surrounding environment.

In some embodiments, visual pattern 72 of offshore structure monitoring system 600 comprises a quick response (QR) code readable by camera 64 whereby a computer generated image or model of offshore structure 66 may be projected onto a visual interface or screen at a remote location (e.g., a surface vessel positioned above offshore structure 66) for monitoring by personnel of offshore structure monitoring system 600. In some embodiments, multiple visual patterns 72, each comprising a QR code, are positioned on an exterior of offshore structure 66 to permit the computer generated image to be projected with six degrees-of-freedom. In this manner, personnel of offshore structure monitoring system 600 may continuously monitor the orientation of the offshore structure 66 at the remote location by monitoring the orientation of the projected computer generated image.

Figure 10:
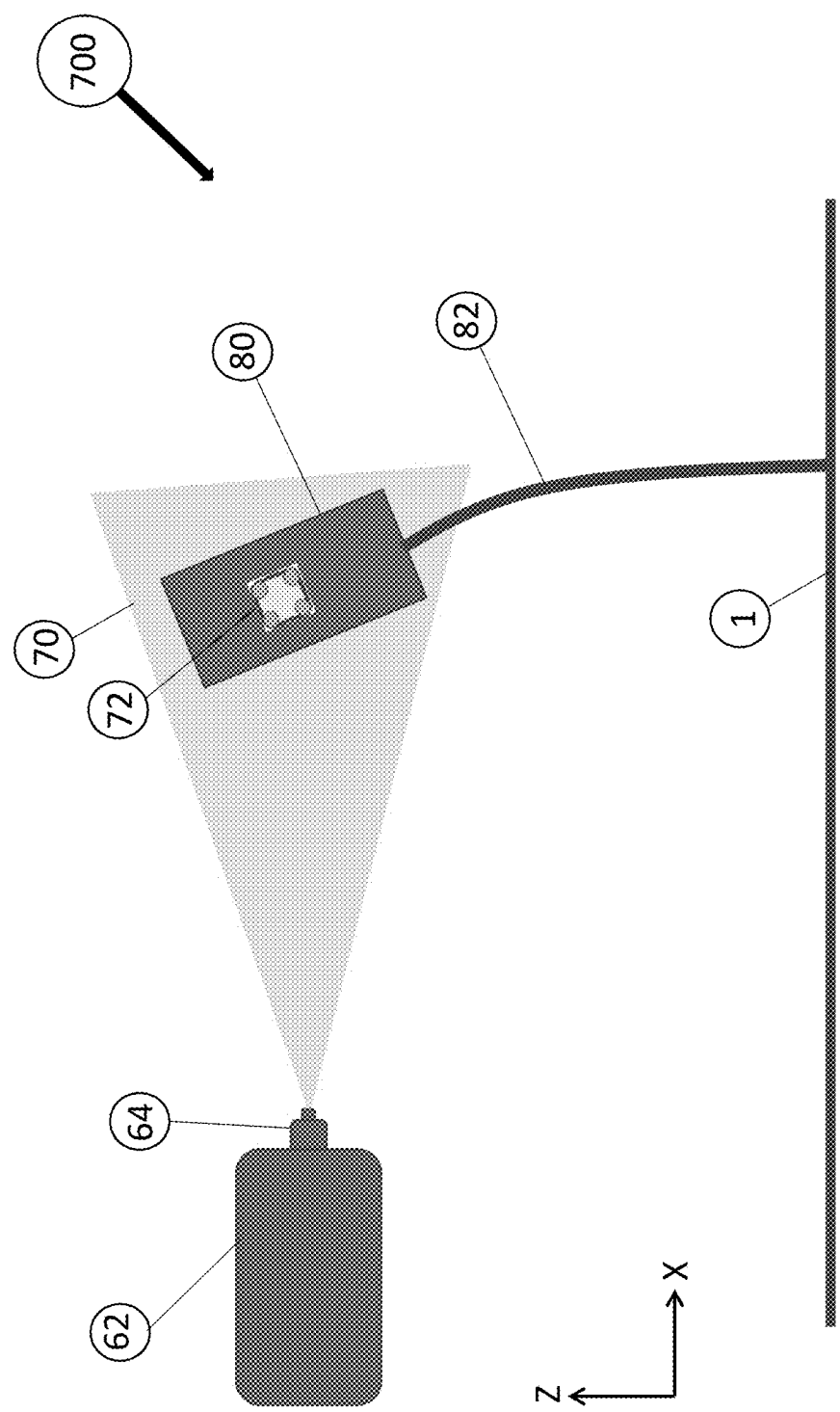

Referring now to FIG. 10, another embodiment of a system 700 for visually monitoring an offshore structure is shown. Offshore structure monitoring system 700 includes features in common with the offshore structure monitoring system 600 shown in FIG. 9, and shared features are labeled similarly. Particularly, offshore structure monitoring system 700 is similar to offshore structure monitoring system 600 except that system 700 includes an offshore structure 80 that is coupled to the sea floor 1 via a tether 82 extending between offshore structure 80 and the sea floor 1. In this embodiment, ROV 62 is transported to the tethered offshore structure 80 such that a visual pattern 72 positioned on an exterior of tethered offshore structure 80 falls within the field of view 70 of camera 64. In this arrangement, the rigid body motions of tethered offshore structure 80 can be tracked and monitored at a remote location via the visual pattern 72 and camera 64. In some embodiments, multiple visual patterns 72 are positioned on the exterior of offshore structure 80 to permit the remote monitoring of the orientation of tethered offshore structure 80 in three-dimensional space. Further, in certain embodiments, augmented reality is utilized via one or more visual patterns 72 comprising readable QR codes to project a computer generated image or model of the tethered offshore structure 80 onto a screen located remotely (e.g., a surface vessel positioned above offshore structure 80) from tethered offshore structure 80.

Figure 11:
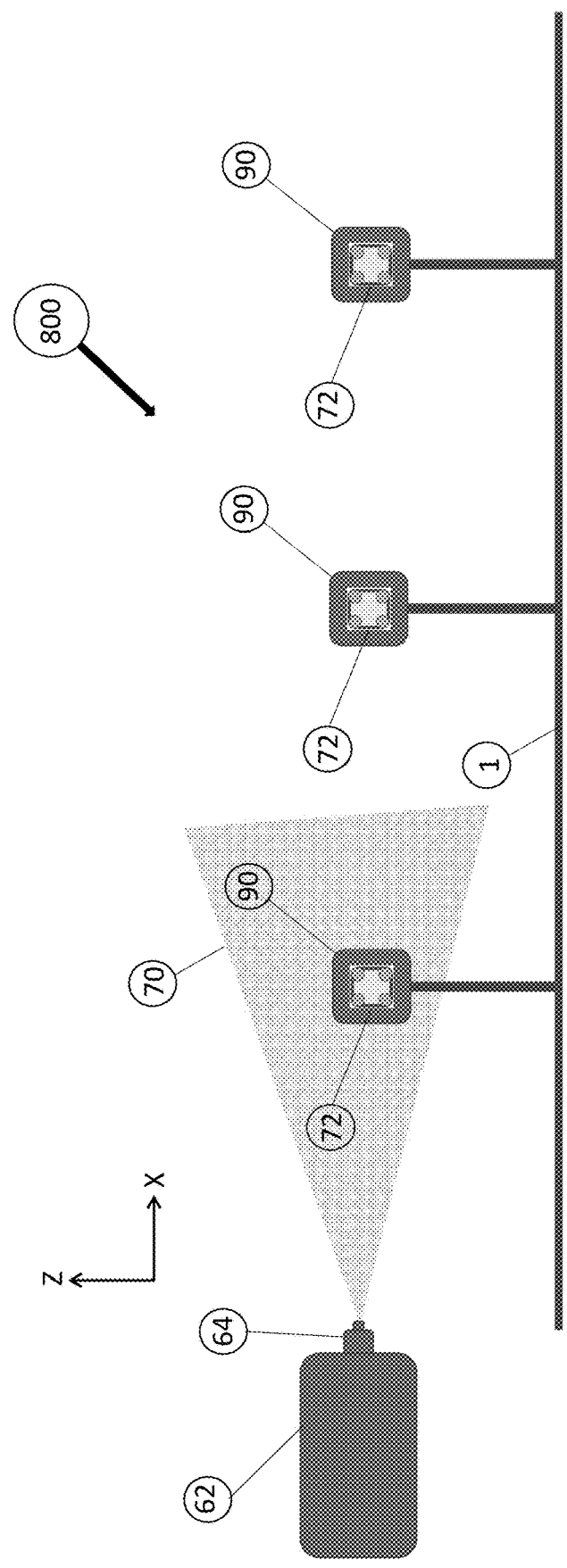

Referring now to FIG. 11, another embodiment of a system 800 for visually monitoring an offshore structure is shown. Offshore structure monitoring system 800 includes features in common with the offshore structure monitoring systems 600, 700 shown in FIGS. 9, 10, respectively, and shared features are labeled similarly. Particularly, offshore structure monitoring system 700 is similar to offshore structure monitoring systems 600, 700 except that system 800 includes a plurality of spaced offshore structures or posts 90 rigidly affixed to the sea floor 1. In this embodiment, ROV 62 is transported to the plurality of offshore posts 90 such that a visual pattern 72 positioned on an exterior of a first offshore post 90 falls within the field of view 70 of camera 64.

In some embodiments, ROV 62 navigates through the subsea environment to a desired location therein by identifying and tracking the position (relative to the ROV 62) of the visual pattern 72 on the plurality of offshore posts 90 using the camera 64 coupled to ROV 62. Thus, by tracking the relative position of the visual patterns 72 positioned on the exteriors of offshore posts 90, ROV 62 may use offshore posts 90 as guide posts or waypoints for directing or guiding the trajectory of the ROV 62 to the desired location in the subsea environment. Additionally, by tracking the positions of visual patterns 72 relative ROV 62 and camera 64, the orientation of ROV 62 in three-dimensional space may be determined and monitored by personnel of offshore structure monitoring system 800 at a remote location. Thus, offshore posts 90 and visual patterns 72 may be used to position ROV 62 both in a desired location within the subsea environment and in a desired orientation at the desired location.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for visually monitoring an offshore subsea structure, comprising:
    a camera configured to capture a first image of the offshore structure and a second image of the offshore structure; and
    a processor coupled to the camera, the processor configured to:
        receive the first image and the second image from the camera;
        recognize a first visual pattern fixably attached to the offshore structure in the first image and the second image;

extract pixel coordinates associated with a first position of the first visual pattern in the first image and a second position of the first visual pattern in the second image; and determine a first distance in physical units between:

the first position of the first visual pattern and the second position of the first visual pattern based on the pixel coordinates associated with the first position of the first visual pattern and the pixel coordinates associated with the second position of the first visual pattern; or the first position of the first visual pattern and a first position of a second visual pattern fixably attached to the offshore structure in the first image.

2. The system of claim 1, wherein the processor is configured to:

determine the first distance in physical units between the first set of pixel coordinates of the first visual pattern in the first image and the first set of pixel coordinates associated with the second visual pattern in the first image;

determine a second distance in physical units between the second set of pixel coordinates of the first visual pattern in the second image and a second set of pixel coordinates associated with the second visual pattern in the second image; and compare the first distance to the second distance to determine a movement of the first visual pattern relative to the second visual pattern in the first image and the second image.

3. The system of claim 1, further comprising a battery configured to power the camera.

4. The system of claim 3, further comprising a communication cable coupling the camera to the processor, wherein the communication cable is configured to transmit the image from the camera to the processor.

5. The system of claim 4, further comprising a transmitter coupled to the processor and configured to wirelessly transmit the first distance determined by the processor.

6. The system of claim 1, wherein the processor is configured to:

determine a magnitude and a direction of a movement of the visual pattern in physical units from the first position of the visual pattern to the second position of the visual pattern based on the pixel coordinates associated with the first position of the visual pattern and the pixel coordinates associated with the second position of the visual pattern.

7. The system of claim 6, wherein the processor is configured to issue an alarm in response to the magnitude of the movement of the visual pattern from the first position to the second position being greater than a predetermined threshold value.

8. The system of claim 6, wherein the processor is configured to determine the movement of visual pattern in six degrees-of-freedom.

9. The system of claim 1, wherein the processor is configured to estimate a strain of the offshore structure based on the first distance between the first position of the visual pattern and the second position of the visual pattern.

10. The system of claim 1, further comprising a gimbal coupled to the camera;

wherein the processor is configured to move the gimbal to control a field of view of the camera.

11. The system of claim 1, further comprising a remotely operated underwater vehicle (ROV), wherein the camera is coupled to the ROV.

12. The system of claim 1, wherein the visual pattern comprises a quick response (QR) code.

13. The system of claim 1, wherein the processor is configured to determine the first distance in physical units between:

the first position of the first visual pattern and the second position of the first visual pattern based on a predetermined physical dimension of the first visual pattern; or the first position of the first visual pattern and a first position of a second visual pattern based on the physical dimension of the first visual pattern prestored on the memory and a predetermined physical dimension of the second visual pattern.

14. The system of claim 1, further comprising:

a memory device connected to the processor;

wherein the processor is configured to determine the first distance in physical units between:

the first position of the first visual pattern and the second position of the first visual pattern based on a physical dimension of the first visual pattern prestored on the memory; or the first position of the first visual pattern and a first position of a second visual pattern based on the physical dimension of the first visual pattern prestored on the memory and a physical dimension of the second visual pattern prestored on the memory.

15. A method for visually monitoring a subsea offshore structure, comprising:

(a) capturing a first image of a first visual pattern fixably attached to the subsea offshore structure;

(b) capturing a second image of the first visual pattern after (a);

(c) determining a first set of pixel coordinates associated with the first visual pattern in the first image and a second set of pixel coordinates associated with the first visual pattern in the second image; and (d) determining a first distance in physical units between:

(i) the first set of pixel coordinates of the first visual pattern in the first image and the second set of pixel coordinates associated with the first visual pattern in the second image; or (ii) the first set of pixel coordinates of the first visual pattern in the first image and a first set of pixel coordinates associated with a second visual pattern fixably attached to the subsea offshore structure in the first image.

16. The method of claim 15, wherein (d) comprises:

determining the first distance in physical units between the first set of pixel coordinates of the first visual pattern in the first image and the first set of pixel coordinates associated with the second visual pattern in the first image;

determining a second distance in physical units between the second set of pixel coordinates of the first visual pattern in the first image and a second set of pixel coordinates associated with the second visual pattern in the second image; and comparing the first distance to the second distance to determine a movement of the first visual pattern relative to the second visual pattern between the first image and the second image.

17. The method of claim 15, wherein (d) comprises converting a distance in pixels to the first distance in physical units based on a predetermined physical dimension of the first visual pattern.

18. The method of claim 15, wherein:

(a) comprises capturing the image using a camera;

the method further comprises:
(e) transmitting the image from the camera to a processor along a communication cable.

19. The method of claim 18, wherein the camera is positioned on a subsea skid and the processor is positioned above a waterline.

20. The method of claim 15, further comprising:
(e) capturing a temporally ordered plurality of images;
(f) extracting pixel coordinates of the first visual pattern in each of the plurality of images;
(g) determining a magnitude and a direction of a movement of the first visual pattern based on changes in the pixel coordinates between the plurality of images; and
(h) converting the magnitude and the direction of the movement of the first visual pattern from changes in the pixel coordinates to physical units to estimate a physical displacement of the first visual pattern.

21. The method of claim 20, further comprising:
(i) issuing an alarm in response to the magnitude of the movement of the first visual pattern being greater than a predetermined threshold value.

22. The method of claim 15, further comprising:
(e) moving a gimbal coupled to a camera that captures the first image and the second image to control a field of view of the camera.

23. The method of claim 15, further comprising:
(e) transporting a camera that captures the first image and the second image through a subsea environment using a remotely operated underwater vehicle (ROV).

24. The method of claim 23, further comprising:
(f) guiding the trajectory of the ROV in response to the first image and the second image.

25. The method of claim 23, further comprising:
(f) moving the ROV in the subsea environment to maintain the first visual pattern in a field of view of the camera as the offshore structure is installed in the subsea environment.

26. The method of claim 15, wherein (d) comprises determining the first distance in physical units between:
(i) the first set of pixel coordinates of the first visual pattern in the first image and the second set of pixel coordinates associated with the first visual pattern in the second image based on a predetermined physical dimension of the first visual pattern; or
(ii) the first set of pixel coordinates of the first visual pattern in the first image and a first set of pixel coordinates associated with the second visual pattern based on the predetermined physical dimension of the first visual pattern and a predetermined physical dimension of the second visual pattern.

27. The method of claim 15, further comprising:
(e) storing in a memory device at least one of a physical dimension of the first visual pattern and a physical dimension of the second visual pattern prior to (c).

* * * * *